US012466038B2

(12) United States Patent
Rönblom et al.

(10) Patent No.: US 12,466,038 B2
(45) Date of Patent: Nov. 11, 2025

(54) SOCKET FOR A TIGHTENING TOOL

(71) Applicant: ATLAS COPCO INDUSTRIAL TECHNIQUE AB, Stockholm (SE)

(72) Inventors: Johan Rönblom, Saltsjö-Boo (SE); Adam Klotblixt, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 352 days.

(21) Appl. No.: 17/766,642

(22) PCT Filed: Oct. 15, 2020

(86) PCT No.: PCT/EP2020/079082
§ 371 (c)(1),
(2) Date: Apr. 5, 2022

(87) PCT Pub. No.: WO2021/083679
PCT Pub. Date: May 6, 2021

(65) Prior Publication Data
US 2023/0048818 A1 Feb. 16, 2023

(30) Foreign Application Priority Data
Oct. 29, 2019 (SE) .................................... 1930350-2

(51) Int. Cl.
*B25B 21/02* (2006.01)
*B25B 23/00* (2006.01)

(52) U.S. Cl.
CPC .......... *B25B 21/02* (2013.01); *B25B 23/0035* (2013.01)

(58) Field of Classification Search
CPC ............................ B25B 21/02; B25B 23/0035
See application file for complete search history.

(56) References Cited

U.S. PATENT DOCUMENTS 2,476,632 A * 7/1949 Shaff ........................ B25B 21/02 477/177
2,712,254 A * 7/1955 Schodeberg .......... B25B 21/026 173/93.6

(Continued)

FOREIGN PATENT DOCUMENTS

EP 1048414 A1 11/2000
EP 1738877 A2 1/2007

(Continued)

OTHER PUBLICATIONS

Atlas Copco Industrial Technique AB, International Patent Application No. PCT/EP2020/079082, International Search Report, Jan. 27, 2021.

(Continued)

*Primary Examiner* — Thanh K Truong
*Assistant Examiner* — David G Shutty
(74) *Attorney, Agent, or Firm* — Moore & Van Allen PLLC; W. Kevin Ransom

(57) ABSTRACT

Disclosed is a socket unit comprising a first body portion comprising a first rear end portion for connection to the output shaft of a power tool and a front end portion adapted for engagement with a screw joint and a second body portion comprising a second rear end portion for connection to the output shaft of the direct driven power tool or a second front end portion adapted for engagement with a screw joint. The second body portion is at least partly arranged in the first body portion, and a relative rotation between the first and second body portions is allowed, such that one of the first and second body portions may rotate over a predetermined allowable angular range when the other is in engagement with the screw joint. The present specification also relates to a corresponding method, power tool and computer readable storage medium.

10 Claims, 2 Drawing Sheets

(56) References Cited

U.S. PATENT DOCUMENTS

| | | | | | |
|---|---|---|---|---|---|
| 2,916,117 | A * | 12/1959 | Ondeck | F16D 43/202 | 192/21 |
| 2,940,565 | A * | 6/1960 | Schodeberg | B25B 21/026 | 173/93.6 |
| 3,268,014 | A * | 8/1966 | Drew | B25D 11/102 | 173/203 |
| 4,098,354 | A * | 7/1978 | Alcenius | B25B 21/02 | 173/93.5 |
| 4,489,792 | A * | 12/1984 | Fahim | B25D 11/106 | 173/29 |
| 5,711,380 | A * | 1/1998 | Chen | A62C 2/065 | 173/48 |
| 5,908,076 | A * | 6/1999 | Marcengill | B25D 16/00 | 173/205 |
| 5,992,538 | A * | 11/1999 | Marcengill | B25D 11/102 | 173/171 |
| 6,733,414 | B2 * | 5/2004 | Elger | B25B 21/02 | 173/205 |
| 6,863,134 | B2 * | 3/2005 | Seith | B25B 21/02 | 173/205 |
| 7,308,948 | B2 * | 12/2007 | Furuta | B25B 21/023 | 173/48 |
| 7,416,031 | B2 * | 8/2008 | Murakami | B25B 21/026 | 173/128 |
| 7,588,093 | B2 * | 9/2009 | Grand | B25B 21/026 | 173/29 |
| 8,042,621 | B2 * | 10/2011 | Barezzani | B25B 21/02 | 173/93.5 |
| 8,371,394 | B2 * | 2/2013 | Grand | B25B 21/02 | 173/29 |
| 8,925,646 | B2 * | 1/2015 | Seith | B25F 5/02 | 173/217 |
| 9,636,809 | B2 * | 5/2017 | Lars Elsmark | B25B 21/02 | |
| 10,471,575 | B2 * | 11/2019 | Nino | A61B 17/00 | |
| 10,625,403 | B2 * | 4/2020 | Hsieh | B25B 21/026 | |
| 10,661,421 | B2 * | 5/2020 | Blum | B25D 11/00 | |
| 2003/0056625 | A1 * | 3/2003 | Bizilia | B25B 21/02 | 81/177.85 |
| 2004/0007098 | A1 | 1/2004 | Hsieh | | |
| 2006/0175773 | A1 * | 8/2006 | Tsai | B25F 3/00 | 279/143 |
| 2006/0237205 | A1 * | 10/2006 | Sia | B25B 23/1405 | 173/128 |
| 2007/0079979 | A1 * | 4/2007 | Braun | B25F 3/00 | 173/29 |
| 2012/0073846 | A1 | 3/2012 | Hirai et al. | | |
| 2012/0255749 | A1 * | 10/2012 | Seith | B25B 21/02 | 173/90 |
| 2013/0264087 | A1 * | 10/2013 | Harada | B23B 45/00 | 173/213 |
| 2014/0158390 | A1 * | 6/2014 | Mashiko | B25B 23/147 | 173/217 |
| 2015/0217433 | A1 | 8/2015 | Seith et al. | | |
| 2017/0036327 | A1 * | 2/2017 | Murakami | B25F 5/006 | |
| 2018/0272510 | A1 * | 9/2018 | Muramatsu | B25B 21/026 | |
| 2019/0184528 | A1 * | 6/2019 | Herr | B25B 21/02 | |

FOREIGN PATENT DOCUMENTS

| | | | |
|---|---|---|---|
| EP | 3037213 | A1 | 6/2016 |
| JP | 2001507996 | A | 6/2001 |
| KR | 101434174 | B1 | 8/2014 |
| KR | 102049206 | B1 | 1/2020 |
| WO | 9830365 | A1 | 7/1998 |
| WO | 2013149724 | A1 | 10/2013 |

OTHER PUBLICATIONS

Atlas Copco Industrial Technique AB, International Patent Application No. PCT/EP2020/079082, Written Opinion, Jan. 27, 2021.

Atlas Copco Industrial Technique AB, International Patent Application No. PCT/EP2020/079082, International Preliminary Report on Patentability, Jan. 19, 2022.

Atlas Copco Industrial Technique AB, Swedish Patent Application No. 1930350-2, Search Report, Apr. 6, 2020.

Atlas Copco Industrial Technique AB, Japanese Patent Application No. 2022-524203, Office Action, Jul. 29, 2024.

* cited by examiner

SOCKET FOR A TIGHTENING TOOL

CROSS-REFERENCE TO RELATED APPLICATIONS

This application is a National Stage Patent Application (filed under 35 § U.S.C. 371) of PCT/EP2020/079082, filed Oct. 15, 2020 of the same title, which, in turn claims priority to Swedish Patent Application No. 1930350-2 filed Oct. 29, 2019 of the same title; the contents of each of which are hereby incorporated by reference.

FIELD OF THE INVENTION

The present invention generally relates to pulsed tightening, more particularly to pulsed tightening performed using direct driven electric tools.

BACKGROUND OF THE INVENTION

Pulsed tightening, where torque is delivered to the joint in repeated pulses is known to be used to for example lower the amount of reaction torque felt by the operator. For example, so called impulse tools comprising an impulse unit arranged to intermittently transfer energy to the output shaft to deliver torque pulses are known. In other cases, electric direct driven tools where a motor housed inside the electric pulse tool applies torque in pulses to the output shaft may also be utilized for pulsed tightening.

In such a case the pulses are provided by accelerating the motor within the inherent play that exist for example in the gearbox between the motor and the output axel and possibly further including any play prevailing between the output shaft and a receiving structure of a socket arranged on the output shaft. Hereby rotational energy is built up in the tool which may be transferred to the screw as a torque pulse when the play is closed. The amount of kinetic energy achievable using such strategies is however limited since only a very limited amount of play to be utilized may be present in the tool before the functionality is impaired.

In order to alleviate some of these problems, attempts have therefore been made to provide such tool with dedicated so called play units allowing the motor to be accelerated over a larger play. Hereby the amount of rotational energy which may be built up in the tool and hence transferred to the screw as a torque pulse may be increased to a certain degree.

However, there are still problems remaining for example in that existing tools need to be modified and redesigned to accommodate such units which in tur may result in a need for multiple tools. Needless to say, such units also of course add to the complexity and size of the tool. Hence there exists a need for improvement in the field of pulsed tightening, more particularly pulsed tightening using direct driven tools.

SUMMARY OF THE INVENTION

Accordingly, it would be desirable to provide pulsed tightening using direct driven tools where higher amounts of energy/torque may be delivered in the repeated torque pulses. In particular, it would be desirable to provide such a solution which does not add considerably to the size and complexity of the tool. To better address one or more of these concerns a socket, a method in a hand held power tool and a hand held electric tool as defined in the independent claims are provided. Preferred embodiments are defined in the dependent claims.

According to a first aspect of the present invention a socket unit for a power tool adapted to perform a tightening operations is provided. The socket unit comprising a first body portion and a second body portion, the first body portion comprising one of a rear end portion for connection to the output shaft of a power tool and a front end portion adapted for engagement with a screw joint and the second body portion comprising the other of the rear end portion for connection to the output shaft of a power tool and the front end portion adapted for engagement with a screw joint. Wherein the second body portion is at least partly arranged in the first body portion, and wherein a relative rotation between the first and second body portion is allowed, such that one of the first and second body portion may rotate over a predetermined allowable angular range when the other of the first and second body portion is in engagement with the screw joint.

According to the first aspect, the socket unit (or socket—these terms will be used interchangeably throughout the present specification) provides an inventive solution to the concerns described above by means of a two-piece design providing a comparatively large and well defined angular play within the socket unit. This by means of allowing a relative rotation between two body portions each engaging a respective one of the screw joint and the output shaft of the tool. Hereby, a much larger play as compared to the play present in for example in the gear box etc. mentioned above utilized in previous designs is provided in a convenient and flexible manner requiring no modification of the power tool but only a simple switch of socket, which as such is a wear part which has to be replaced more or less frequently. Further, as the play is present in the socket, not only the level of vibration but also the reaction torque affecting the operator is significantly reduced thus increasing work place ergonomics as well. The skilled person realizes that a predetermined angular interval may just as well be expressed as a predetermined time interval.

Hence, the socket according to independent claim 1 cleverly increases the energy transferred in each torque pulse and at the same time improves operator ergonomics.

However, during an initial run down phase, both parts of the socket will at least in some embodiments, rotate along together as the gap (or play) will be closed and provide the functionality of a standard socket. The relative rotation may hence be described as being of particular importance and utilization when the screw joint being tightened reaches or is at least close to snug and the rotation of the portion of the socket engaging the socket is hindered.

The second body portion is at least partly arranged in the first body portion, i.e. the second portion is at least partly provided inside, partly enclosed, surrounded or covered by the first body portion. The second body portion may for example be arranged at least partly in a space delimited by the tubular element.

The rear end portion for connection to the output shaft of a tool and the front end portion adapted for engagement with a screw joint may comprise engaging means having any suitable design, such as hex, square or similar. For example, the socket may have a square cross sectional recess at its rear end portion intended for receiving the square shaped end portion of a power tool output shaft and at the front end an internal cross sectional shape adapted to fit the type of screw joint to be tightened, for instance a hexagonal shape. Examples include any combination of square female or male input and output and male or female hex input and output, and the skilled person realizes that any other shape apart from hex such as for example torx may just as well be utilized.

According to one embodiment, the first body portion is a tubular body portion and comprises an open cavity arranged at a first end of the body portion, and wherein the second body portion is arranged at least partly in the open cavity. For example, in one embodiment, the open cavity may have a cylindrical shape.

According to one embodiment, the first portion comprises a first end face and the second body portion comprises a second end face and wherein the first and second end faces lie in a common plane. Hence, in such an embodiment, the second body portion may be arranged completely within a space bounded by the cavity mentioned above, i.e. completely enclosed by the first body portion.

According to one embodiment, the first body portion comprises engaging means adapted to engage a corresponding engaging means comprised by the second body portion in order to provide a mechanical stop limiting the relative rotation. Examples include a protrusion engaging a corresponding groove and a protrusion engaging a corresponding protrusion.

According to one embodiment, the first body portion comprises a first radial protrusion projecting radially inwards forming a first shoulder and wherein the second body portion comprises a second radial protrusion projecting radially outwards forming a second shoulder, such that the first and second shoulder may engage to stop a relative rotation between the first and second body portion. Hereby, the size of the predetermined allowable angular range of the relative rotation may be determined. Further, as mentioned above, during an initial run down phase the gap (or play) will be closed as the shoulders engage and the functionality of a standard socket will be provided during run down.

According to one embodiment, the second body portion comprises a substantially cylindrical first end body section having two protrusions projecting radially outwards. These two projections may be arranged to for example allow a maximum relative rotation of almost 180° before the protrusions hit the corresponding structures. The actual angular range will depend also on the design of the shoulder, where a wider shoulder extending over a larger angle may be utilized to decrease the allowable angular range.

In one embodiment, the second body portion comprises a substantially cylindrical first end body section having three protrusions projecting radially outwards. The skilled person realizes that any other number of protrusions of the respective body portions may be conceivable within the scope of the present specification.

According to one embodiment, the second body portion comprises a substantially cylindrical second end section having a diameter equal to the diameter of the first end body portion and the total radial extension of the two protrusions projecting radially outwards. The diameter is further preferably adapted to the inner diameter of the cavity formed in the first body portion. Further, the total length of the second body portion may be equal to or smaller than, the axial length (i.e. the depth) of the cavity in order for the second body portion to fit completely within the cavity.

According to one embodiment, the open cavity of the first body portion comprises an inner cylindrical surface and wherein the surface comprises two protrusions projecting radially inward. Hereby, the second body portion may rotate in the cavity over and angular interval where the endpoints are defined by the inwardly projecting protrusions. The skilled person realizes that any other numbers of protrusions is conceivable within the scope of the present specification.

According to one embodiment, the first shoulder comprises a substantially flat engaging surface extending in the radial direction and the second shoulder comprises a second substantially flat engaging surface extending in the radial direction, such that the first and second engaging surface may make contact along the flat engaging surfaces thereby providing the mechanical stop limiting the relative rotation. Hereby, an advantageously efficient impact may be achieved making energy transfer as efficient as possible.

In one embodiment, the radial protrusions extend along 25-75% of the axial length of the body portion, e.g. along approximately half the axial length of the second body portion. In one embodiment, the second radial protrusions extend along 25-75% of the axial length of the body portion, e.g. along approximately half the axial length of the open cavity.

In one embodiment, the socket further comprises a pin rotatably connecting the first and second body portion. Such a pin may extend through a respective hole formed in the first and second body portion. In other embodiment, the first and second body portion bear rotationally against one another and rotate in sliding contact. In some embodiments, the socket may comprise other element arranged to hold the first and second body portion together, where examples include a snap ring arranged between two adjacent congruent surfaces of the first and second body portion respectively. Such a snap ring may in one embodiment be arranged on a shoulder, or ledge, formed on the first or second body portion.

According to one embodiment, the first body portion comprises a rear end portion for connection to the output shaft of a power tool and the second body portion comprises a front end portion adapted for engagement with a screw joint. In such an embodiment, the first body portion may rotate over a predetermined allowable angular range when the second body portion is in engagement with the screw joint and is hindered from rotation—i.e. as the tightening process has reached or is close to snug. The relative first body portion may in this embodiment comprise an open cavity formed at the front end, in which the second body portion may be partly or fully arranged. In the latter case, the respective front faces of the first and second body portion may lie in a common plane, this plane mat coincide with a work piece surface as the nut or bolt is seated.

According to one embodiment, the second body portion comprises a rear end portion for connection to the output shaft of a power tool and the first body portion comprises a front end portion adapted for engagement with a screw joint. In such an embodiment, the second body portion may rotate over a predetermined allowable angular range when the second body portion is hindered from rotation, i.e. in engagement with the screw joint and the tightening process has reached or is close to snug. The relative rotation of the second body may for example take place within the cavity formed in the first body portion, in this case in an upper or rear part of the first body portion.

According to one embodiment, the allowable range for the relative rotation is 50-120°, and preferably 90-110°. Smaller or larger values may be conceivable within the scope depending on the application.

According to a second aspect of the present invention, a method in a hand held electric tool for performing tightening operations where torque is delivered in pulses to tighten a screw joint is provided, the hand held electric pulse tool comprising an output shaft, the method comprising the steps of providing a first torque pulse on the output shaft in the tightening direction, rotating the output shaft in a direction opposite to the tightening direction over a predetermined angular interval (this may also be expressed as a predetermined time interval) and providing a second torque pulse on the output shaft in the tightening direction.

According to one embodiment, a method in a hand held electric tool for performing tightening operations where torque is delivered in pulses to tighten a screw joint is provided, the hand held electric pulse tool comprising an output shaft, wherein a socket according to any of the preceding claims is arranged on the output shaft of the tool and engages a screw joint, the method comprising the steps of providing a first torque pulse on the output shaft in the tightening direction, rotating the output shaft in a direction opposite to the tightening direction such that the first body portion rotates with respect to the second body portion as the second body portion is in engagement with the screw joint and providing a second torque pulse on the output shaft in the tightening direction such that the first body portion accelerates over the predetermined allowable angular range before hitting the second body portion arranged in engagement with the screw joint. Hereby, the additional large and well defined play provided by the inventive socket may be utilized to a full degree, allowing for a considerably larger inertia based pulse to be delivered to the joint as compared to using a standard pulse strategy. The rotation in the opposite direction, i.e. the size or length of the reverse movement, may be adapted to the angular range for the relative movement provided by the socket used.

According to a third aspect of the present invention, a hand held electric tool for performing tightening operations where torque is delivered in pulses to tighten a screw joint is provided, wherein the hand held electric tool comprises an output shaft and is adapted to engage a socket according to any of the embodiment described above, the tool being operative to provide a first torque pulse on the output shaft in the tightening direction, rotate the output shaft in a direction opposite to the tightening direction over a predetermined angular interval and provide a second torque pulse on the output shaft in the tightening direction. The tool, which may be a battery powered tool, may further comprise an electric motor and a processor arranged to control the electric motor, and further a memory containing instructions executable by the processor. Hence, as the software instructions are executed by the processor, the electrical power tool is operative to perform the steps described above. The tool may be a direct driven electric power tool.

According to a further aspect of the present invention, a computer readable storage medium having stored there on a computer program, comprising computer readable code, which when run in the power tool causes the power tool to perform the method according to any of the embodiments described above is provided.

Objectives, advantages and features of the power tool and storage medium conceivable within the scope of the third and fourth aspect of the invention are readily understood by the foregoing discussion referring to the first and second aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION OF THE INVENTION

Figure 1:
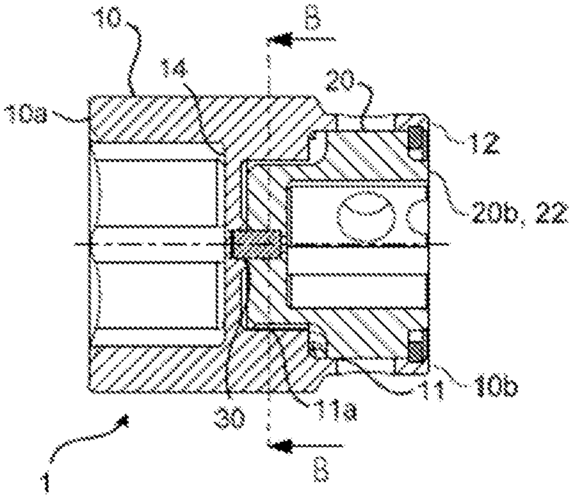
FIG. 1 is a longitudinal cross sectional view of an exemplary socket unit according to a first embodiment.

An exemplary socket unit 1 according to a first embodiment for use with a tightening tool according to a first embodiment is shown in a longitudinal cross sectional view in FIG. 1. The socket unit 1 comprising a first body portion 10 and a second body portion 20. In the illustrated embodiment, the first body portion comprises a rear end portion 10*a* for connection to the output shaft of a power tool whereas the second body portion 20 comprises a front end portion 20*b* adapted for engagement with a screw joint.

The first body portion 10 may further be described as a tubular body comprising an open cavity 11 arranged at a front end 10*b* in which the second body portion 20 is arranged. The open cavity is delimited at an upper end of a delimiting wall extending through the tubular body 10. Further, the first body portion 10 comprises a first end face 12 and the second body portion 20 comprises a second end face 22 which lie in a common plane. It follows that the axial length of the cavity 11 is equal to the axial length of the second body portion such that the second body portion 20 is arranged completely within the cavity 11.

The second body portion 20 is further arranged in the cavity such that a relative rotation between the first and second body portion is allowed. Hereby, the first body portion 10 may rotate over a predetermined allowable angular range also for example when the second body portion 20 is in engagement with a screw joint, in or close to snug, thereby hindering any rotation of the second body portion 20. In the illustrated embodiment, the socket unit comprises a pin 30, e.g. a needle roller 30, rotatably connecting the first and second body portion 10, 20 but the second body portion 20 may in other embodiments simply bear rotatably against a delimiting wall 14 forming an end of the open cavity 11. In the illustrated embodiment, the allowable range for the relative rotation is approximately 100°. In order to further hold the first and second body portion 10, 20 together a retaining element 40 is provided, in the illustrated embodiment a snap ring 40 (shown in FIG. 5).

Figure 2:
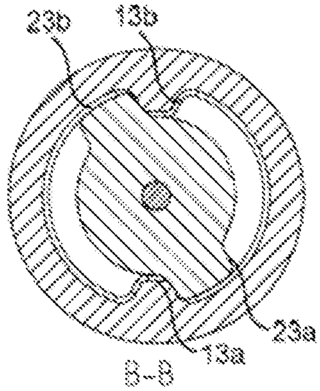
FIG. 2 is a transverse cross sectional view of an exemplary socket unit.

In order to limit this relative rotation, a mechanical stop functionality is realized by means of engaging means 13*a*, 13*b* on the first body portion 10 adapted to engage corresponding engaging means 23*a*, 23*b* comprised by the second body portion 20, shown in cross section in FIG. 2.

These engaging means are in the present embodiment realized as radial protrusions, or shoulders. In the first body portion 10, two radial protrusions or shoulders 13*a*, 13*b* project radially inward and on the second body portion 20 two corresponding radial protrusion 23*a*, 23*b* form shoulders projecting radially outwards, such that said first and second shoulder may engage to stop the relative rotation between said first and second body portion, also shown in FIGS. 3 and 4.

Figure 3:
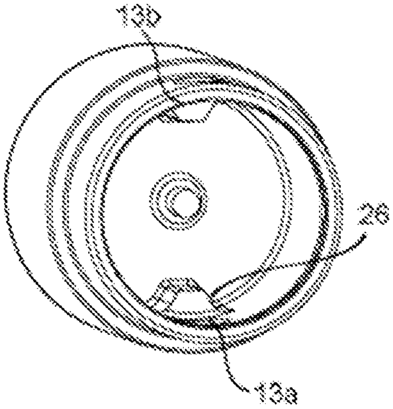
FIG. 3 is a perspective view of the first body portion of a socket unit according to a first embodiment.
Figure 4:
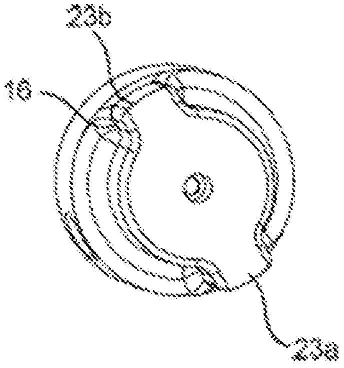
FIG. 4 is a perspective view of the second body portion of a socket unit according to a second embodiment.

As may be seen for example from FIGS. 3 and 4, the shoulders 13*a*; 13*b* of the first body portion 10 are formed on an inner cylindrical surface 11*a* of the open cavity 11 and extend along approximately half the axial length of the open cavity 11 whereas the second body portion comprises a substantially cylindrical end section on which the two shoulder 23*a*, 23*b* are arranged. Similarly to the first body portion, the shoulders 23*a*, 23*b* extend along the axial length of the cylindrical end portion, corresponding to approximately half the length of the second body portion. Further, each of the shoulder comprise substantially flat engaging surfaces 16, 26 extending in a radial direction, along which the shoulders make contact when engaging.

Figure 5:
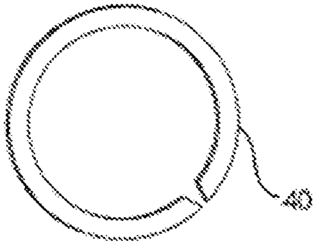
FIG. 5 is a perspective view of a snap ring comprised by a socket unit according to a second embodiment.
Figure 6:
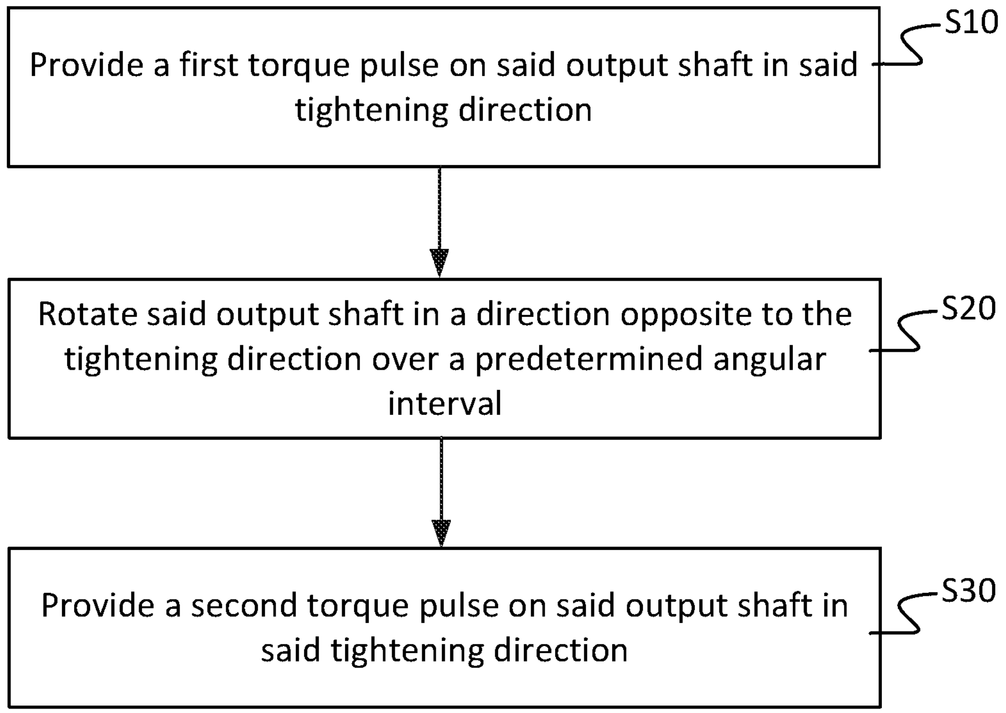
FIG. 6 illustrates a flow chart according to an exemplary embodiment of the present disclosure.

The socket unit according to the embodiment may advantageously be used with an electric direct driven tightening tool performing pulsed tightening, i.e. performing a strategy where the motor delivers torque in pulses to the output shaft. More particularly, the tool which constitutes a further aspect of the invention may when having a socket unit according to the invention arranged on the output shaft be operative to perform a method as shown in FIG. 5 comprising the steps of providing a first torque pulse on the output shaft in the tightening direction (S10), rotating the output shaft in a direction opposite to the tightening direction over a predetermined angular interval or time interval such that the first body portion 10 rotates with respect to the second body portion 20 as the second body portion 20 is in engagement with the screw joint (S20) and providing a second torque pulse on the output shaft in the tightening direction such that the first body portion 10 accelerates over the predetermined allowable angular range before hitting the second body portion 20 arranged in engagement with the screw joint (S30) and hence transferring the torque pulse to the joint.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims. Additionally, variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A socket unit for a direct driven electric power tool adapted to perform a pulsed tightening operation, comprising:

a first body portion comprising a first rear end portion for connection to an output shaft of the direct driven power tool or a first front-end portion adapted for engagement with a screw joint; and a second body portion, comprising a second rear end portion for connection to the output shaft of the direct driven power tool or a second front end portion adapted for engagement with the screw joint;

wherein said second body portion is at least partly arranged in said first body portion, wherein said first body portion is tubular in shape and comprises an open cavity that is cylindrical in shape and arranged at a first end of said first body portion, and wherein said second body portion is arranged at least partly in said open cavity, wherein said first body portion comprises a first radial protrusion projecting radially inward forming a first shoulder, wherein said second body portion comprises a substantially cylindrical first end section having two second radial protrusions projecting radially outwards and wherein said two second radial protrusions form a second shoulder projecting radially outwards in a radial direction, such that said first shoulder and said second shoulder are configured to engage each other to stop a relative rotation between said first body portion and said second body portion, wherein said second body portion comprises a substantially cylindrical second end section with diameter substantially equal to the diameter of said first body portion and wherein the radial extension of said two second radial protrusions projects radially outwards, wherein the second end section of said second body portion is located in the open cavity of the first body portion and the diameter of the second end section is substantially equal to the inner diameter of the open cavity of the first body portion, and wherein the relative rotation between said first body portion and said second body portion is allowed, such that one of said first body portion and said second body portion are configured to rotate over a predetermined allowable angular range when the other of said first body portion and said second body portion is in engagement with said screw joint.

2. A socket unit according to claim 1, wherein said first body portion comprises a first end face and said second body portion comprises a second end face and wherein said first end face and said second end face lie in a common plane.

3. A socket unit according to claim 1, wherein said open cavity comprises two protrusions projecting radially inward.

4. A socket unit according to claim 1, wherein said first shoulder comprises a first engaging surface extending in said radial direction and said second shoulder comprises a second engaging surface extending in said radial direction, such that said first engaging surface and said second engaging surface are configured to make contact along said engaging surfaces thereby providing a mechanical stop limiting of said relative rotation between said first body portion and said second body portion.

5. A socket unit according to claim 1, wherein said allowable angular range for said relative rotation is 50-120°.

6. A socket unit according to claim 1, wherein said allowable angular range for said relative rotation is 90-110°.

7. A method in a direct driven electric power tool for performing tightening operations where torque is delivered in pulses to tighten a screw joint, the direct driven electric power tool comprising an output shaft and a socket unit according to claim 1 connected to the output shaft, the method comprising the steps of:

providing a first torque pulse on said output shaft in a tightening direction;

rotating said output shaft in a direction opposite to said tightening direction over a predetermined angular interval; and providing a second torque pulse on said output shaft in said tightening direction.

8. A direct driven electric power tool for performing tightening operations where torque is delivered in pulses to tighten a screw joint, wherein the direct driven electric power tool comprises an output shaft and a socket unit according to claim 1 connected to the output shaft, the direct driven electric power tool being operative to:

provide a first torque pulse on said output shaft in a tightening direction;

rotate said output shaft in a direction opposite to said tightening direction over a predetermined angular interval range; and provide a second torque pulse on said output shaft in said tightening direction.

9. A non-transitory computer readable storage medium having stored there on a computer program comprising instruction code which when run by a processor in a direct driven electric power tool according to claim 8 causes the direct driven electric power tool to perform the steps of:

providing a first torque pulse on said output shaft in said tightening direction;

rotating said output shaft in a direction opposite to said tightening direction over a predetermined angular interval; and providing a second torque pulse on said output shaft in said tightening direction.

10. A socket unit for a direct driven electric power tool adapted to perform a pulsed tightening operation, comprising:

a first body portion comprising a first rear end portion for connection to an output shaft of the direct driven power tool or a first front-end portion adapted for engagement with a screw joint; and a second body portion, comprising a second rear end portion for connection to the output shaft of the direct driven power tool or a second front end portion adapted for engagement with the screw joint;

wherein said second body portion is at least partly arranged in said first body portion, wherein said first body portion is tubular in shape and comprises an open cavity that is cylindrical in shape and arranged at a first end of said first body portion, and wherein said second body portion is arranged at least partly in said open cavity, wherein said first body portion comprises a first radial protrusion projecting radially inward forming a first shoulder, wherein said second body portion comprises a substantially cylindrical first end section having two second radial protrusions projecting radially outwards and wherein said two second radial protrusions form a second shoulder projecting radially outwards in a radial direction, such that said first shoulder and said second shoulder are configured to engage each other to stop a relative rotation between said first body portion and said second body portion, wherein said second body portion comprises a substantially cylindrical second end section with diameter substantially equal to the diameter of said first body portion and wherein the radial extension of said two second radial protrusions projects radially outwards, wherein the diameter of the second end portion is substantially equal to the inner diameter of the open cavity formed in the first body portion, wherein the relative rotation between said first body portion and said second body portion is allowed, such that one of said first body portion and said second body portion are configured to rotate over a predetermined allowable angular range when the other of said first body portion and said second body portion is in engagement with said screw joint, and wherein said first body portion comprises a first end face and said second body portion comprises a second end face and wherein said first end face and said second end face lie in a common plane.

* * * * *